(No Model.)
2 Sheets—Sheet 1.

J. JESSOP.
POTATO PLANTER.

No. 553,618. Patented Jan. 28, 1896.

Witnesses:
J. F. Coleman
E. A. Finckel

Inventor
Jonathan Jessop
by W. H. Finckel
Atty.

(No Model.) 2 Sheets—Sheet 2.
J. JESSOP.
POTATO PLANTER.
No. 553,618. Patented Jan. 28, 1896.
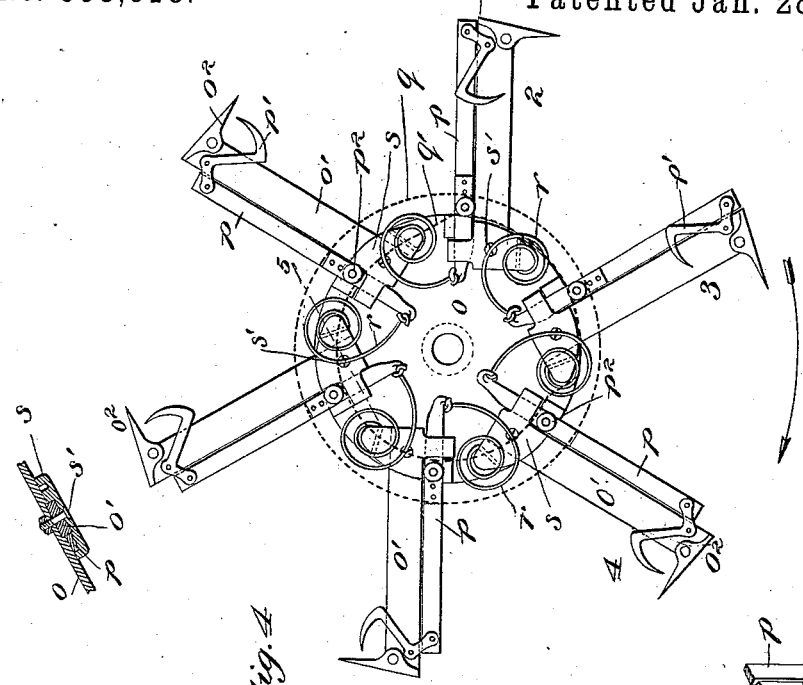
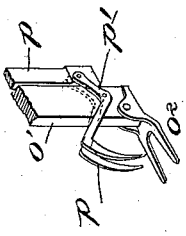
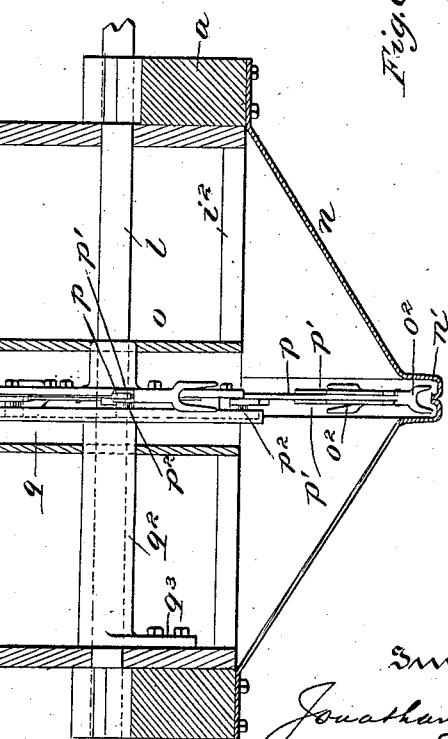
Witnesses
J. F. Coleman
E. A. Finckel
Inventor
Jonathan Jessop
by Wm. H. Finckel
Atty
ANDREW B.GRAHAM, PHOTO-LITHO. WASHINGTON, D.C.

UNITED STATES PATENT OFFICE.

JONATHAN JESSOP, OF YORK, PENNSYLVANIA, ASSIGNOR OF ONE-HALF TO LAURA SUSAN SPANGLER, OF SAME PLACE.

POTATO-PLANTER.

SPECIFICATION forming part of Letters Patent No. 553,618, dated January 28, 1896.

Application filed June 15, 1895. Serial No. 552,913. (No model.)

*To all whom it may concern:*

Be it known that I, JONATHAN JESSOP, a citizen of the United States, residing at York, in the county of York and State of Pennsylvania, have invented a certain new and useful Improvement in Potato-Planters, of which the following is a full, clear, and exact description.

Potato-planters—that is to say, machines for planting potatoes—have been made before with a frame supported on wheels so as to be dragged by horses over the field to be planted, and have been provided with a hopper in which the seed-potatoes are placed, and such hopper has had combined with it and driven from the driving-wheels or supporting-wheels of the machine a revolving planting device, which, as the machine is dragged across the field, is caused to revolve within the hopper and successively pick up therefrom one or more potatoes and carry them around into a position where they are discharged and deposited in the open furrow, and thereafter covered up. A great variety of devices has been devised for thus picking up the seed-potatoes and discharging them from the hopper, and one feature of my invention relates to this pick-up mechanism, and another to the hopper from which the potatoes are picked up. It has been proposed, also, to combine with the potato-planter a distributer for depositing along with the seed any suitable kind of fertilizer.

Another feature of my invention has reference to such fertilizer-distributer.

Having thus stated, in a general sort of way, the principle of my invention, I will proceed to describe the best mode in which I have contemplated applying that principle, and then will particularly point out and distinctly claim the part, improvement or combination which I claim as my invention.

Figure 1:
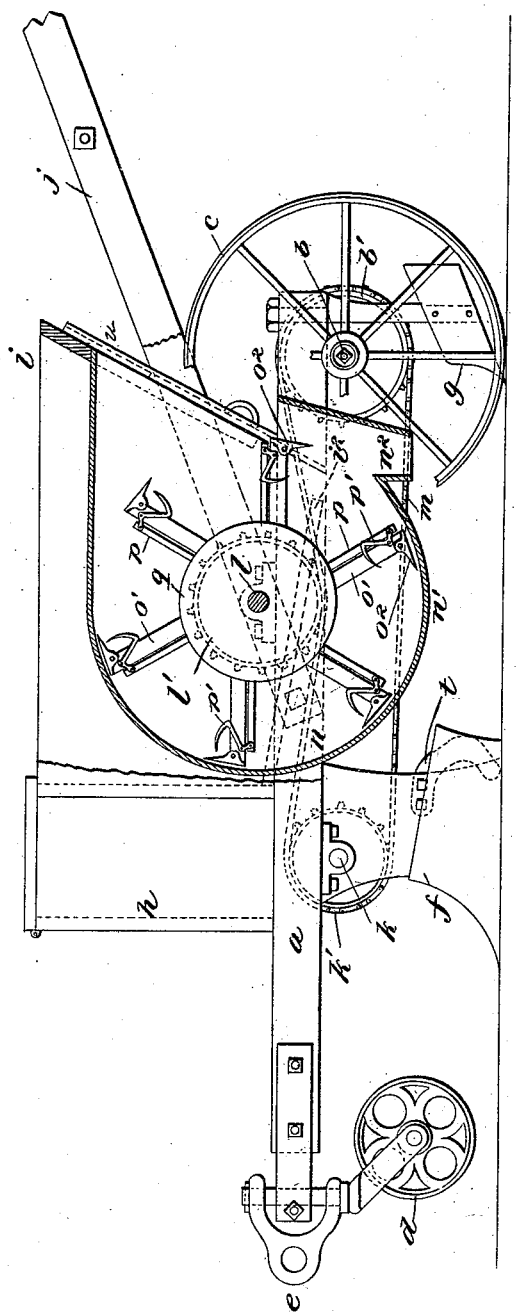
Figure 2:
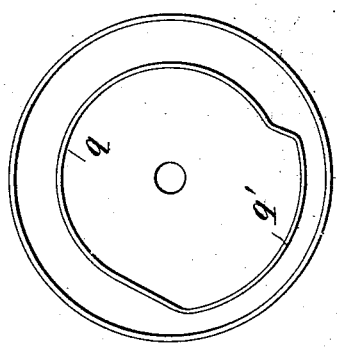

In the accompanying drawings, illustrating my invention, in the several figures of which like parts are similarly designated, Figure 1 is a side elevation with the potato-hopper in vertical section, and showing my invention embodied in a combined potato-planter and fertilizer-distributer. Fig. 2 is an elevation of the face of a cam used in connection with the potato-planting mechanism. Fig. 3 is a vertical cross-section of a potato-planter hopper, showing the potato-planter wheel or pick-up mechanism in elevation. Fig. 4 is a side elevation of the potato-planter wheel or pick-up mechanism detached. Fig. 5 is a section taken in the plane of line 5, Fig. 4; and Fig. 6 is a perspective view of one end of one of the pick-up arms.

The frame $a$ may be of any approved construction, and mounted upon it is the axle $b$, on which are secured the drive-wheels $c$. $d$ is the pilot-wheel, of any approved construction, and $e$ the clevis. $f$ is the plow. $g$ represents one of the shovels. $h$ represents the fertilizer-distributer hopper, $i$ the potato-hopper, and $j$ the handles, all of which may be of usual construction, excepting as hereinafter described.

A shaft $k$, mounted upon the frame $a$, may receive or be connected with the feeding device within the fertilizer-hopper, and this shaft also has a sprocket-wheel $k'$. $l$ is a shaft, likewise mounted upon the frame $a$ and arranged transversely of the potato-hopper, and upon it is mounted a sprocket-wheel $l'$. (Indicated in dotted lines in Fig. 1.) On the axle $b$ is a sprocket-wheel $b'$. These three sprocket-wheels may be connected by a sprocket-chain $m$ in such manner that the shaft $l$ will be driven in a reverse direction to the direction of rotation of the axle $b$—that is to say, the shaft $l$ will turn toward the rear of the machine.

Within the hopper $i$ is a housing $i'$, standing vertically therein and substantially in its center and rising from the inner bottom, $i^2$, of such hopper, the said bottom $i^2$ slanting from front to rear, as indicated by the dotted lines, Fig. 1. The outer bottom, $n$, of the hopper is composed of metal plates, preferably two castings, bolted to the frame $a$, and converging thence toward one another and formed with a trough $n'$ in alignment with the pick-up mechanism presently described. As will be seen upon reference to Fig. 1, this outer bottom of the hopper is described upon the arc of a circle concentric with the circle of the housing $i'$. At the rear of the machine is the discharge chute or duct $n^2$.

The pick-up mechanism is composed of a hub $o$, made fast to the shaft $l$, and having arranged thereon, tangentially with respect to the axis, or otherwise, as may be desired, arms $o'$, the outer ends of which are provided with the fixed forks $o^2$. In the rear of these arms $o'$ are arranged slides $p$, on the outer ends of which are secured the pairs of hooks $p'$, the said hooks being fulcrumed upon the arms $o'$, and also pivoted to the slides $p$. The said hooks $p'$, of which there are two to each arm and slide, as indicated in Fig. 6, have their points turned outward so as to co-operate with the tines of the forks $o^2$. Each slide $p$ is provided with a roller $p^2$, which roller travels along the cam $q$. (See Figs. 1, 2, and 3 and the heavy dotted line in Fig. 4.) These slides are normally drawn inward toward the axis by means of the volute springs $r$. These volute springs engage the slides by one of their ends, and the other ends of said springs are secured in the clamp-plates $s$. These clamp-plates, as shown by reference to Figs. 4 and 5, are or may be castings, properly recessed to receive the arms $o'$ and the slides $p$, as well as the said volute springs. A stove or other bolt $s'$ is passed through each of the clamps, and also through the arm $o'$ and the hub, and made fast by an appropriate nut on the back of the hub, thus in a very simple and inexpensive manner uniting these several parts and providing for the longitudinal movement of the slides, as the rollers $p^2$ on said slides are acted upon by the lump $q'$ of the cam, as the pick-up device by its rotation brings each of the said rollers successively into contact with the said lump.

In order to render the arms $o'$ as stable as possible, the face of the hub may be recessed, as indicated in Fig. 5, partially to receive such arms.

The cam $q$ has a sleeve $q^2$ which encircles the shaft $l$, and such sleeve has a depending flange $q^3$, by which it may be bolted to the side of the hopper or to the frame, so as to hold said cam stationary, while permitting the revolution of the shaft $l$. Now, the lump of the cam being arranged toward the rear of the machine, it is evident that as each successive arm comes adjacent to said lump the roller $p^2$ of such arm will ride up upon the lump, and thereby the slide will be projected outwardly, and consequently the hooks $p'$ will be moved away from the fork $o^2$.

Let it be supposed that the pick-up mechanism (designated 2 in Fig. 4) has just discharged the seed and has moved down into the position 3, which is in the rear of the vertical center of the pick-up mechanism. Then in the further rotation of the pick-up device in the direction of the arrow, Fig. 4, the slide of this opened pick-up device will run off of the lump, and in so doing it will pick up from the trough $n'$ on its hooks $p'$ a potato, and then will close down upon such potato, as indicated at 4, binding such potato against the fork, and so carrying it upward until the lump on the cam is again reached, when, as already indicated, the slide will be projected outwardly, and thereby the hooks will be moved away from the fork and their points brought within the leading edges of the arm, so that the said potato will be stripped from said hooks and fall thence through the chute or discharge-spout $n^2$ in front of the shovels $g$ into the earth and be by such shovels covered in the furrow.

It will be observed that while the devices for picking up and discharging the potatoes are automatic in action they also act positively, both in the picking up of the potatoes and in their discharge, and hence there is no liability of the pick-up mechanism choking.

As will be understood by the foregoing description, the volute springs $r$ return the slides to their normal position, so as to close the hooks up against the forks after the rollers of the said slides have passed off of the lump of the cam.

The fertilizer-distributer may be arranged to discharge the fertilizer down in front of the plow, so that it may be thoroughly mixed with the ground, or it may be arranged to pass such fertilizer down inside of the plow, so as to be only slightly mixed with the earth; and in order to effect this mixture of the fertilizer with the earth when it is discharged inside the plow I make use of two or more small mixing-shovels $t$, (see Fig. 1,) which are suspended from the frame or otherwise within and in the rear of the plow $f$.

The usual provision may be made for throwing the pick-up mechanism and also the fertilizer-distributer mechanism into and out of gear for operation. So, also, any usual provision may be made for varying the speed.

Other forms of driving means than the chain and sprocket-wheels may be employed.

The hopper $i$ is divided into two compartments by the housing $i'$, and communication between these compartments and the outer bottom is controlled by the gates $u$ at the rear of the hopper, so that the potatoes may be fed from either or both of the compartments.

The housing $i'$ is left open at the rear, so that the operator may see whether or not the machine is planting properly.

The raised center in the trough of the hopper prevents the potatoes from adhering to the bottom, and the utility of this provision will be apparent when it is recalled with what tenacity a cut potato will stick to a surface on which it falls. This raised center, in connection with the points of the forks extending well down into the channels on either side of it and at an incline to their arms, insures the lifting of the potatoes from the trough and their engagement by the hooks.

While I prefer to make the outer bottom of two pieces, I do not so limit my invention.

What I claim is—

1. A potato planter, comprising a frame, drive wheels, a potato hopper, a pick-up mechanism or feed device therein, a fertilizer distributer and a sprocket chain and sprocket wheels connecting the drive wheels, pick-up mechanism and the fertilizer distributer and turning the pick-up mechanism toward the rear of the machine, substantially as described.

2. In a potato planter, the combination of a hopper provided with an inner bottom, a housing arranged centrally therein and rising from the inner bottom, a pick-up mechanism arranged to revolve within said housing, and an outer bottom composed of converging sides forming a trough or groove in which the pick-up mechanism also turns, and having a discharge spout at the rear, substantially as described.

3. A pick-up mechanism for potato planters, comprising a hub, a revolving shaft upon which it is mounted, arms projecting from such hub and provided with forks at their outer ends, slides arranged next to said arms, and adapted to be moved longitudinally, hooks pivoted near the outer ends of the arms and secured to the slides, and means to reciprocate said slides longitudinally, substantially as described.

4. A pick-up mechanism for potato planters, comprising a hub, a revolving shaft upon which it is mounted, arms projecting from such hub and provided with forks at their outer ends, slides arranged next to said arms, and adapted to be moved longitudinally, hooks pivoted near the outer ends of the arms and secured to the slides, springs applied to said slides and normally retracting them, and a cam adapted to act upon the said slides to cause them to withdraw their hooks away from the forks of the arms and thereafter permit the springs to act to throw the said hooks toward the said forks, substantially as described.

5. In a potato planter, a pick-up mechanism or feeding device, comprising a hub, a shaft upon which it is fixed and with which it rotates, a series of arms applied to said hub and preferably tangential with relation to the axis of the said hub, slides arranged adjacent to said arms, springs for the movement of the said slides in one direction, and clamp plates applied to the hub and confining the arms, slides and springs in position, substantially as described.

6. A pick-up mechanism for potato planters, comprising a hub, stationary arms thereon, forks applied to said arms, slides arranged adjacent to said arms and carrying movable hooks, springs acting upon said slides normally to close the hooks, a cam having a lump disposed to open the hooks at predetermined points in the revolution of the pick-up mechanism, a sleeve on said cam by which it is mounted upon the pick-up shaft, and a flange on said sleeve by which the said cam is fixed in a stationary position with relation to the revolving hub, substantially as described.

7. In a pick-up mechanism for potato planters, the combination with the arms having forks at their outer ends, of slides arranged adjacent to said arms, hooks pivoted on opposite sides of said arms next to the forks thereon, and also pivoted to the slides and adapted to be moved back and forth with relation to said forks, the said hooks in their movement away from the forks having their points carried within the leading edges of the arms, thereby to strip from said hooks the potatoes impaled thereupon, and thereby to positively effect the discharge of the potatoes, substantially as described.

8. In a potato planter, a pick-up mechanism or feeding device, comprising a hub, arms applied thereto, forks arranged upon the outer ends of the said arms, slides arranged in the rear of the said arms, rollers applied to said slides, a cam arranged next to said hub and upon which the rollers work in order to move the said slides in one direction, and springs applied to the said slides to move the said slides in the other direction, when released by the cam, substantially as and for the purpose described.

9. In a potato planter, the combination with the hopper, of an outer bottom therefor having a trough provided with a raised center, substantially as described.

10. In a potato planter, the combination with a pick-up mechanism, of a hopper having a bottom provided with a trough arranged in the line of travel of the pick-up mechanism and constructed with a central raised portion, substantially as described.

11. In a potato planter, the combination of a rotary pick-up mechanism, having fixed arms provided with terminal forks set at an incline thereon, movable hooks to take up and discharge the potatoes, and a hopper having a bottom constructed with a trough aligned with the pick-up mechanism, and having a central elevation dividing it into channels in which the points of the forks travel, substantially as described.

In testimony whereof I have hereunto set my hand this 10th day of June, A. D. 1895.

JONATHAN JESSOP.

Witnesses:
ROBT. M. BARRISTER,
M. S. ADAMS.